Nov. 4, 1952 R. H. BERGSTRÖM 2,616,326
TOOL POST FOR LATHES
Filed May 18, 1949 2 SHEETS—SHEET 1
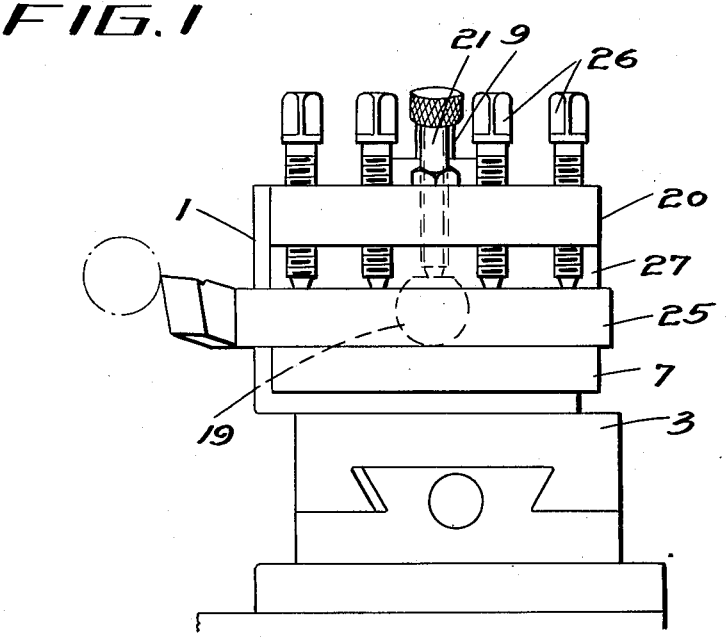
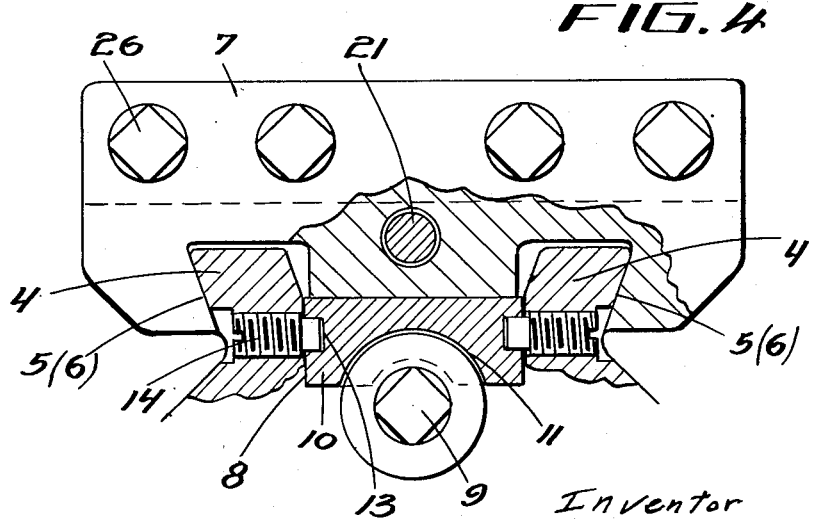
Inventor
Roar Henry Bergstrom
By E. L. Wenderoth
Attorney

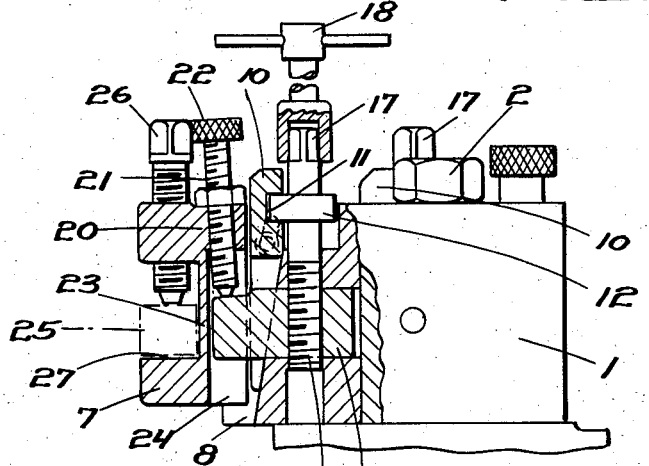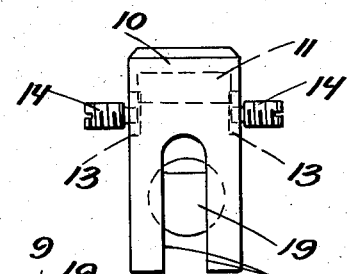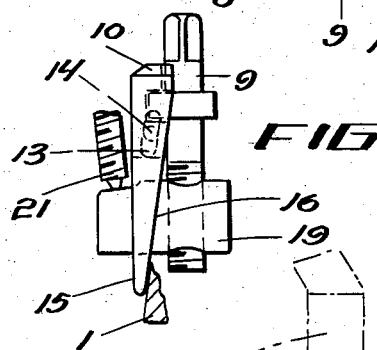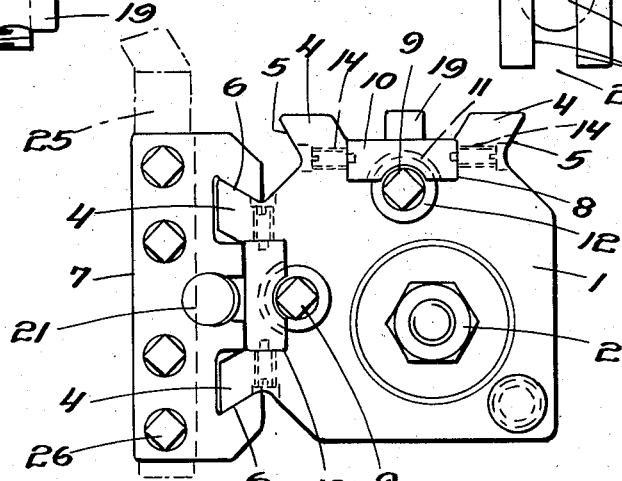

Patented Nov. 4, 1952

2,616,326

UNITED STATES PATENT OFFICE 2,616,326

TOOL POST FOR LATHES

Roar Henry Bergström, Skovde, Sweden

Application May 18, 1949, Serial No. 93,951
In Sweden September 29, 1948

4 Claims. (Cl. 82—36)

This invention relates to tool posts which are to be clamped, for instance, to the carriage of a lathe, and which are provided with means for clamping the tool holder to the post proper, said means including guide surfaces adapted to cooperate with corresponding guide surfaces on the tool holder.

The invention has for a principal object to provide a tool post for lathes of this character which is of extremely durable construction.

Another object of the invention is to enable highly effective clamping action to be obtained between the tool holder and the post, so that no vibration will occur between said parts.

Another object is to make provision for the tool post to resist greater loads than is the case with tool posts of the known construction where the tool holder is clamped to the post proper by an eccentric arrangement or the like.

For the objects stated, according to a particularly useful embodiment of the invention, the lower end of the screw for vertically adjusting the tool holder is supported by a shoulder projecting horizontally intermediate the guide surfaces of the tool holder. In this case such shoulder and also the lower end of the adjusting screw will be satisfactorily protected against chips etc.

Other objects and advantages will be apparent from the following description with reference to the accompanying drawings in which:

Fig. 1 is a side view of a tool holder clamped to a post proper mounted on the carriage of a lathe.

Fig. 2 is a plan view of the post proper and the tool holder.

Fig. 3 is an end view of the post and the tool holder shown partly broken away.

Fig. 4 is a horizontal view to a larger scale showing the tool holder and the adjacent portion of the post, the parts being shown partly in horizontal section.

Fig. 5 is a side view of the clamping means for the tool holder.

Fig. 6 is a frontal view of the latter.

The post proper 1 which, in the usual manner, can be clamped to the carriage 3 of a lathe, is provided on two adjacent sides with two pairs of guide members 4 the remotest lateral surfaces 5 of which are divergent in an outward direction and serve as guide surfaces cooperating with correspondingly shaped guide surfaces 6 of the tool holder 7. A wedge 10 is disposed in a recess 8 between the guides 4 and is displaceable therein by means of a screw 9. The wedge is provided with an arcuate recess 11 which is engaged by a peripherally extending collar 12 on the driving screw 9. In its edge surfaces the wedge 10 is provided with elongated grooves 13 engaged by the inner ends of two guide screws 14, respectively. The outer surface 15 of the wedge 10 is vertical, and the inner surface thereof 16 is preferably inclined about 10° relative to the vertical plane. The bottom of the recess 8 has the same inclination. The screw 9, having a square head 17 and being rotatable in one sense or the other by means of a handle 18 formed as a socket wrench, is threaded through a nut 19 inserted into the post 1 and having an extension the outer end portion of which projects into the recess 8. This outer end portion of the extension of the nut 19 forms a shoulder which is contacted by the lower end of an adjusting screw 21 passed through the tool holder 7, said screw 21 being arranged to be slightly inclined in such a manner that its head 22 will be sufficiently spaced from the head 17 of the screw 9 to enable both said screws to be conveniently operated. The inclination of the adjusting screw 21 also involves the advantage that the inner wall 23 of the tool holder 7 need not be bored through. Thus no chips or the like can penetrate into the space 24 into which the extension of the nut 19 projects, and both the nut 19 and the lower end of the screw 21 will be satisfactorily protected against damage. The turning tool 25 may be clamped to the tool holder 7 in a channel 27 therein by means of set screws in the usual manner.

Owing to the fact that the adjusting screw 21 is situated approximately centrally between the guide surfaces 6 on the tool holder 7 the holder, when slipped over the guide members 4 from above, and the lower end of the adjusting screw 21 finally contacts the shoulder on the nut 19, will necessarily adjust itself in the proper horizontal position. Thereafter, when the wedge 10 is displaced downward by means of the screw 9, the wedge will press its outer surface against the inner surface of the tool holder whereby the holder will be pressed straight outward so that the guide surfaces 6 of the same will engage the guide surfaces 5 on the post 1. On account of the large contact area, the number of contact surfaces being no less than six, and of the great force by which the wedge 10 can be depressed, an exceptionally firm clamping of the tool holder to the post proper will be obtained. Sufficiently firm clamping can be obtained even if the tool holder 7 does not occupy its lowermost position, as shown in Fig. 3. Satisfactory clamping will thus be obtained even if the holder be lowered only half-way over the guide members 4. Thereby it will be possible to have two tool holders simultaneously mounted on the post proper thus enabling two tools to be used for carrying out a turning operation.

By arranging the extension of the nut 19, as shown in Fig. 6, to project through a downwardly open recess 28 in the wedge 10, it will be possible to obtain sufficiently good guiding action for the wedge 10 by forming the lateral surfaces of the stud in such a manner that the side surfaces 29 of said recess will slide over the same. In this case no separate guiding will be necessary between the side edges of the wedge 10 and the side surfaces of the recess 8.

It will be understood that the embodiment illustrated and described in the foregoing is to be considered merely as given by way of example, the post proper 1 and the tool holder 7 as well as the means for clamping the latter to the post 1 being capable of being structurally varied in several ways without departing from the scope of invention. The only essential thing resides in giving the guide surfaces 5 and 6 such a shape that the clamping of the tool holder 7 is obtained by displacing the same in an outward direction.

What I claim and desire to secure by Letters Patent is:

1. A tool post comprising a post proper having means for clamping it to a support, a tool holder, an adjusting screw for vertically adjusting said tool holder relative to said post proper, guide surfaces on said post proper, corresponding guide surfaces on said tool holder and cooperating with said guide surfaces on said post proper upon vertically adjusting said tool holder, all said guide surfaces being parallel and co-extensive with the sides of said post proper and said tool holder, a wedge disposed between said post proper and said tool holder, and a screw for vertically moving said wedge in one sense or the other, said wedge being adapted when moved downwards to press said tool holder outward for causing the guide surfaces of the latter to engage the guide surfaces of said post proper; an extension member partially extending into a recess in said post proper and disposed substantially centrally intermediate said guide surfaces on said tool holder and projecting into the path of motion of said adjusting screw for said tool holder, said extension having a threaded bore therein, said screw for vertically moving said wedge being threaded and coacting with said threaded bore, a collar on said threaded screw coacting with said wedge for vertical movement thereof upon actuation of said screw coacting with said threaded bore, and a shoulder on said extension forming a stop for the lower end of said adjusting screw.

2. A tool post as claimed in claim 1, further comprising a vertically extending recess in said post proper, said wedge being displaceable in said recess, said wedge being provided in its side edges with two oppositely disposed grooves extending longitudinally thereof, and two oppositely aligned guide pins projecting from said post proper, the inner ends of said guide pins engaging said grooves for guiding said wedge.

3. A tool post as claimed in claim 2, further comprising a transversely extending recess in said wedge, and said collar being peripherally arranged on said screw and said recess being engaged by said collar.

4. A tool post as claimed in claim 1, in which said adjusting screw is inclined in such a manner that its head will be relatively widely spaced from the head of said wedge-moving screw.

ROAR HENRY BERGSTRÖM.

REFERENCES CITED

The following references are of record in the file of this patent:

UNITED STATES PATENTS

| Number | Name | Date |
|---|---|---|
| 690,763 | Parker | Jan. 7, 1902 |
| 751,701 | Tiffany | Feb. 9, 1904 |
| 1,959,140 | Peterson | May 15, 1934 |
| 2,148,852 | Bergstrom | Feb. 28, 1939 |
| 2,390,148 | Hijmans | Dec. 4, 1945 |
| 2,403,405 | Sirola | July 2, 1946 |